(12) United States Patent
Upton

(10) Patent No.: US 7,721,193 B2
(45) Date of Patent: May 18, 2010

(54) SYSTEM AND METHOD FOR IMPLEMENTING A SCHEMA OBJECT MODEL IN APPLICATION INTEGRATION

(75) Inventor: Mitch Upton, Highlands Ranch, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 318 days.

(21) Appl. No.: 10/271,047

(22) Filed: Oct. 15, 2002

(65) Prior Publication Data
US 2003/0182452 A1    Sep. 25, 2003

Related U.S. Application Data

(60) Provisional application No. 60/347,919, filed on Oct. 18, 2001, provisional application No. 60/347,901, filed on Oct. 18, 2001.

(51) Int. Cl.
*G06N 3/00* (2006.01)
(52) U.S. Cl. ..................................... 715/234
(58) Field of Classification Search .............. 715/513, 715/733, 531, 517, 523, 530, 234, 243, 254, 715/255
See application file for complete search history.

(56) References Cited

U.S. PATENT DOCUMENTS

| 5,321,841 | A | 6/1994 | East et al. ................... 395/725 |
| 5,469,562 | A | 11/1995 | Saether |
| 5,604,860 | A | 2/1997 | McLaughlin et al. |
| 5,630,131 | A | 5/1997 | Palevich et al. |
| 5,748,975 | A | 5/1998 | Van De Vanter ............ 715/531 |
| 5,801,958 | A | 9/1998 | Dangelo et al. |
| 5,835,769 | A | 11/1998 | Jervis et al. .................. 717/113 |

(Continued)

FOREIGN PATENT DOCUMENTS

CA    2248634    3/2000

(Continued)

OTHER PUBLICATIONS

Paul, Laura Gibbone, "RosettaNet: Teaching business to work together", Oct. 1, 1999. http://www.developer.com/xml/article.php/616641.

(Continued)

*Primary Examiner*—Kyle R Stork
(74) *Attorney, Agent, or Firm*—Fliesler Meyer LLP

(57) ABSTRACT

Communication can be passed between components, such as an enterprise system and a client application, by utilizing schemas. A schema can ensure that a communication, such as a request or response, is in the proper format for one of the components. For instance, metadata can be received from an enterprise system in response to a request from a client application. That metadata can be transformed into an XML document that conforms to an XML schema, such as by an XML schema mechanism. At least portions of the XML document can be validated against the XML schema, such as by using a schema object model. The XML document can be passed on to the client application after validation.

This description is not intended to be a complete and accurate description of the invention or to limit the scope of the invention. Other features, aspects, and objects of the invention can be obtained from a review of the specification, the figures, and the claims.

17 Claims, 4 Drawing Sheets

U.S. PATENT DOCUMENTS

| | | | |
|---|---|---|---|
| 5,836,014 A | 11/1998 | Faiman, Jr. | 717/156 |
| 5,862,327 A | 1/1999 | Kwang et al. | 709/203 |
| 5,867,822 A | 2/1999 | Sankar | |
| 5,933,838 A | 8/1999 | Lomet | 707/202 |
| 5,944,794 A | 8/1999 | Okamoto et al. | |
| 5,950,010 A | 9/1999 | Hesse et al. | 717/178 |
| 5,961,593 A | 10/1999 | Gabber et al. | 709/219 |
| 5,966,535 A | 10/1999 | Benedikt et al. | |
| 6,012,083 A | 1/2000 | Savitzky et al. | |
| 6,016,495 A | 1/2000 | McKeehan et al. | |
| 6,018,730 A | 1/2000 | Nichols et al. | |
| 6,023,578 A | 2/2000 | Birsan et al. | |
| 6,023,722 A | 2/2000 | Colyer | 709/201 |
| 6,028,997 A | 2/2000 | Leymann et al. | |
| 6,029,000 A | 2/2000 | Woolsey et al. | |
| 6,044,217 A | 3/2000 | Brealey et al. | 717/107 |
| 6,067,623 A | 5/2000 | Blakley et al. | |
| 6,070,184 A | 5/2000 | Blount et al. | |
| 6,085,030 A | 7/2000 | Whitehead et al. | 709/203 |
| 6,092,102 A | 7/2000 | Wagner | |
| 6,119,149 A | 9/2000 | Notani | 709/205 |
| 6,125,363 A | 9/2000 | Buzzeo et al. | |
| 6,141,686 A | 10/2000 | Jackowski et al. | 709/224 |
| 6,141,701 A | 10/2000 | Whitney | |
| 6,148,336 A | 11/2000 | Thomas et al. | |
| 6,154,738 A | 11/2000 | Call | 707/4 |
| 6,185,734 B1 | 2/2001 | Saboff et al. | |
| 6,189,044 B1 | 2/2001 | Thomson et al. | 709/242 |
| 6,212,546 B1 | 4/2001 | Starkovich et al. | |
| 6,222,533 B1 | 4/2001 | Notani | 715/733 |
| 6,226,675 B1 | 5/2001 | Meltzer et al. | 709/223 |
| 6,226,788 B1 | 5/2001 | Schoening et al. | 717/107 |
| 6,230,287 B1 | 5/2001 | Pinard et al. | 714/31 |
| 6,230,309 B1 | 5/2001 | Turner | 717/107 |
| 6,237,135 B1 | 5/2001 | Timbol | 717/107 |
| 6,243,737 B1 | 6/2001 | Flanagan et al. | |
| 6,256,676 B1 | 7/2001 | Taylor et al. | |
| 6,269,373 B1 | 7/2001 | Apte et al. | 707/10 |
| 6,282,711 B1 | 8/2001 | Halpern et al. | 717/175 |
| 6,292,932 B1 | 9/2001 | Baisley et al. | |
| 6,311,327 B1 | 10/2001 | O'Brien et al. | |
| 6,324,681 B1 | 11/2001 | Sebesta | 717/102 |
| 6,330,569 B1 | 12/2001 | Baisley et al. | |
| 6,334,114 B1 | 12/2001 | Jacobs et al. | |
| 6,336,122 B1 | 1/2002 | Lee et al. | 707/204 |
| 6,338,064 B1 | 1/2002 | Ault et al. | 707/9 |
| 6,343,265 B1 | 1/2002 | Glebov et al. | |
| 6,345,283 B1 | 2/2002 | Anderson | 707/205 |
| 6,348,970 B1 | 2/2002 | Marx | 358/1.15 |
| 6,349,408 B1 | 2/2002 | Smith | 717/174 |
| 6,353,923 B1 | 3/2002 | Bogel et al. | 717/128 |
| 6,356,906 B1 | 3/2002 | Lippert et al. | 707/10 |
| 6,360,221 B1 | 3/2002 | Gough et al. | 707/10 |
| 6,360,358 B1 | 3/2002 | Elsbree et al. | |
| 6,367,068 B1 | 4/2002 | Vaidyanathan et al. | |
| 6,377,939 B1 | 4/2002 | Young | |
| 6,393,605 B1 | 5/2002 | Loomans | 717/121 |
| 6,408,311 B1 | 6/2002 | Baisley et al. | |
| 6,411,698 B1 | 6/2002 | Bauer et al. | |
| 6,438,594 B1 | 8/2002 | Bowman-Amuah | 709/225 |
| 6,445,711 B1 | 9/2002 | Scheel et al. | |
| 6,463,503 B1 | 10/2002 | Jones et al. | 711/114 |
| 6,470,364 B1 | 10/2002 | Prinzing | |
| 6,516,322 B1 | 2/2003 | Meredith | |
| 6,549,949 B1 | 4/2003 | Bowman-Amuah | 709/236 |
| 6,560,769 B1 | 5/2003 | Moore et al. | |
| 6,567,738 B2 | 5/2003 | Gopp et al. | |
| 6,584,454 B1 | 6/2003 | Hummel et al. | |
| 6,594,693 B1 | 7/2003 | Borwankar | 709/219 |
| 6,594,700 B1 | 7/2003 | Graham et al. | |
| 6,601,113 B1 | 7/2003 | Koistinen et al. | |
| 6,604,198 B1 | 8/2003 | Beckman et al. | 713/167 |
| 6,609,115 B1 | 8/2003 | Mehring et al. | |
| 6,615,258 B1 | 9/2003 | Barry et al. | |
| 6,636,491 B1 | 10/2003 | Kari et al. | |
| 6,637,020 B1 | 10/2003 | Hammond | |
| 6,643,652 B2 | 11/2003 | Helgeson et al. | |
| 6,654,932 B1 | 11/2003 | Bahrs et al. | |
| 6,662,357 B1 | 12/2003 | Bowman-Amuah | |
| 6,678,518 B2 | 1/2004 | Eerola | |
| 6,684,388 B1 | 1/2004 | Gupta et al. | |
| 6,687,702 B2 | 2/2004 | Vaitheeswaran et al. | |
| 6,687,848 B1 | 2/2004 | Najmi | |
| 6,721,740 B1 | 4/2004 | Skinner et al. | |
| 6,721,779 B1 | 4/2004 | Maffeis | |
| 6,732,237 B1 | 5/2004 | Jacobs et al. | 711/119 |
| 6,738,975 B1 | 5/2004 | Yee et al. | |
| 6,748,420 B1 | 6/2004 | Quatrano et al. | |
| 6,754,884 B1 | 6/2004 | Lucas et al. | |
| 6,757,689 B2 | 6/2004 | Battas et al. | |
| 6,789,054 B1 | 9/2004 | Makhlouf | |
| 6,795,967 B1 | 9/2004 | Evans et al. | 719/310 |
| 6,799,718 B2 | 10/2004 | Chan et al. | |
| 6,802,000 B1 | 10/2004 | Greene et al. | 713/168 |
| 6,804,686 B1 | 10/2004 | Stone et al. | 707/104.1 |
| 6,823,495 B1 | 11/2004 | Vedula et al. | |
| 6,832,238 B1 | 12/2004 | Sharma et al. | |
| 6,836,883 B1 | 12/2004 | Abrams et al. | |
| 6,847,981 B2 | 1/2005 | Song et al. | |
| 6,850,979 B1 | 2/2005 | Saulpaugh et al. | |
| 6,859,180 B1 | 2/2005 | Rivera | |
| 6,874,143 B1 | 3/2005 | Murray et al. | |
| 6,877,023 B1 | 4/2005 | Maffeis et al. | |
| 6,889,244 B1 | 5/2005 | Gaither et al. | |
| 6,915,519 B2 | 7/2005 | Williamson et al. | |
| 6,918,084 B1 | 7/2005 | Slaughter et al. | |
| 6,920,461 B2 * | 7/2005 | Hejlsberg et al. | 707/103 R |
| 6,922,827 B2 | 7/2005 | Vasilik et al. | |
| 6,950,872 B2 | 9/2005 | Todd, II | |
| 6,959,307 B2 | 10/2005 | Apte | |
| 6,959,340 B1 | 10/2005 | Najmi | |
| 6,963,914 B1 | 11/2005 | Breitbart et al. | |
| 6,971,096 B1 | 11/2005 | Ankireddipally et al. | |
| 6,976,086 B2 | 12/2005 | Sadeghi et al. | |
| 7,000,219 B2 | 2/2006 | Barrett et al. | |
| 7,017,146 B2 | 3/2006 | Dellarocas et al. | |
| 7,043,722 B2 | 5/2006 | Bau, III | |
| 7,051,072 B2 | 5/2006 | Stewart et al. | |
| 7,051,316 B2 | 5/2006 | Charisius et al. | |
| 7,054,858 B2 | 5/2006 | Sutherland | |
| 7,062,718 B2 | 6/2006 | Kodosky et al. | |
| 7,069,507 B1 | 6/2006 | Alcazar et al. | |
| 7,072,934 B2 | 7/2006 | Helgeson et al. | |
| 7,073,167 B2 | 7/2006 | Iwashita | |
| 7,076,772 B2 | 7/2006 | Zatloukal | |
| 7,089,584 B1 | 8/2006 | Sharma | |
| 7,096,422 B2 | 8/2006 | Rothschiller et al. | |
| 7,107,578 B1 | 9/2006 | Alpern | |
| 7,111,243 B1 | 9/2006 | Ballard et al. | |
| 7,117,504 B2 | 10/2006 | Smith et al. | |
| 7,127,704 B2 | 10/2006 | Van De Vanter et al. | |
| 7,134,072 B1 * | 11/2006 | Lovett et al. | 715/234 |
| 7,143,186 B2 | 11/2006 | Stewart et al. | |
| 7,146,422 B1 * | 12/2006 | Marlatt et al. | 709/227 |
| 7,155,705 B1 | 12/2006 | Hershberg et al. | |
| 7,165,041 B1 | 1/2007 | Guheen et al. | |
| 7,181,731 B2 | 2/2007 | Pace et al. | |
| 7,184,967 B1 | 2/2007 | Mital et al. | |
| 7,231,421 B2 | 6/2007 | Kawakura et al. | |
| 7,240,331 B2 | 7/2007 | Vion-Dury et al. | |
| 7,260,599 B2 | 8/2007 | Bauch et al. | |
| 7,260,818 B1 | 8/2007 | Iterum et al. | |
| 7,269,625 B1 | 9/2007 | Willhide et al. | |
| 7,406,664 B1 | 7/2008 | Morton et al. | |

| | | |
|---|---|---|
| 2001/0032263 A1 | 10/2001 | Gopal et al. |
| 2002/0004848 A1 | 1/2002 | Sudarshan et al. |
| 2002/0010781 A1 | 1/2002 | Tuatini |
| 2002/0010803 A1 | 1/2002 | Oberstein et al. |
| 2002/0016759 A1 | 2/2002 | Marcready et al. |
| 2002/0035604 A1 | 3/2002 | Cohen et al. |
| 2002/0038336 A1 | 3/2002 | Abileah et al. |
| 2002/0049788 A1 | 4/2002 | Lipkin et al. |
| 2002/0073080 A1* | 6/2002 | Lipkin .................... 707/3 |
| 2002/0073236 A1 | 6/2002 | Helgeson et al. |
| 2002/0073396 A1 | 6/2002 | Crupi et al. |
| 2002/0078365 A1 | 6/2002 | Burnett et al. |
| 2002/0083075 A1 | 6/2002 | Brummel et al. |
| 2002/0091944 A1 | 7/2002 | Anderson et al. |
| 2002/0111922 A1 | 8/2002 | Young et al. |
| 2002/0116454 A1 | 8/2002 | Dyla et al. |
| 2002/0120685 A1 | 8/2002 | Srivastava et al. |
| 2002/0138582 A1 | 9/2002 | Chandra et al. |
| 2002/0143960 A1 | 10/2002 | Goren et al. |
| 2002/0152106 A1 | 10/2002 | Stoxen et al. |
| 2002/0152244 A1* | 10/2002 | Dean et al. .................. 707/530 |
| 2002/0161826 A1 | 10/2002 | Arteaga et al. |
| 2002/0165936 A1 | 11/2002 | Alston et al. |
| 2002/0169644 A1 | 11/2002 | Greene |
| 2002/0174178 A1 | 11/2002 | Stawikowski |
| 2002/0174241 A1 | 11/2002 | Beged-Dov et al. |
| 2002/0184145 A1* | 12/2002 | Sijacic et al. ................. 705/40 |
| 2002/0184610 A1 | 12/2002 | Chong et al. |
| 2002/0188486 A1 | 12/2002 | Gil et al. |
| 2002/0188513 A1 | 12/2002 | Gil et al. |
| 2002/0194221 A1* | 12/2002 | Strong et al. ................ 707/513 |
| 2002/0194244 A1 | 12/2002 | Raventos |
| 2002/0194267 A1 | 12/2002 | Flesner et al. |
| 2002/0194495 A1 | 12/2002 | Gladstone et al. |
| 2003/0004746 A1 | 1/2003 | Kheirolomoom et al. |
| 2003/0005181 A1 | 1/2003 | Bau, III et al. |
| 2003/0014439 A1 | 1/2003 | Boughannam |
| 2003/0018661 A1 | 1/2003 | Darugar |
| 2003/0018665 A1 | 1/2003 | Dovin et al. |
| 2003/0018832 A1 | 1/2003 | Amierisetty et al. |
| 2003/0018963 A1 | 1/2003 | Ashworth et al. |
| 2003/0023957 A1 | 1/2003 | Bau, III et al. |
| 2003/0028579 A1 | 2/2003 | Kulkarni et al. |
| 2003/0039594 A1* | 2/2003 | Pikus .......................... 422/138 |
| 2003/0041050 A1 | 2/2003 | Smith et al. |
| 2003/0041198 A1 | 2/2003 | Exton et al. |
| 2003/0043191 A1 | 3/2003 | Tinsley et al. |
| 2003/0046266 A1 | 3/2003 | Mullins et al. |
| 2003/0046591 A1 | 3/2003 | Asghari-Kamrani et al. |
| 2003/0051063 A1 | 3/2003 | Skufca et al. |
| 2003/0051066 A1 | 3/2003 | Pace et al. |
| 2003/0055868 A1 | 3/2003 | Fletcher et al. |
| 2003/0055878 A1 | 3/2003 | Fletcher et al. |
| 2003/0065827 A1 | 4/2003 | Skufca et al. |
| 2003/0069975 A1* | 4/2003 | Abjanic et al. ............... 709/227 |
| 2003/0074217 A1 | 4/2003 | Beisiegel et al. |
| 2003/0074467 A1 | 4/2003 | Oblak et al. |
| 2003/0079029 A1 | 4/2003 | Garimella et al. |
| 2003/0084203 A1 | 5/2003 | Yoshida et al. |
| 2003/0093470 A1 | 5/2003 | Upton |
| 2003/0110117 A1 | 6/2003 | Saidenberg et al. |
| 2003/0110446 A1 | 6/2003 | Nemer |
| 2003/0126136 A1 | 7/2003 | Omoigui |
| 2003/0149791 A1 | 8/2003 | Kane et al. |
| 2003/0167358 A1 | 9/2003 | Marvin et al. |
| 2003/0196168 A1 | 10/2003 | Hu |
| 2003/0233631 A1 | 12/2003 | Curry |
| 2004/0019645 A1 | 1/2004 | Goodman et al. |
| 2004/0040011 A1 | 2/2004 | Bosworth et al. |
| 2004/0068568 A1 | 4/2004 | Griffin |
| 2004/0078373 A1 | 4/2004 | Ghoneimy et al. |
| 2004/0103406 A1 | 5/2004 | Patel |
| 2004/0133660 A1 | 7/2004 | Junghuber et al. |
| 2004/0148336 A1 | 7/2004 | Hubbard et al. |
| 2004/0204976 A1 | 10/2004 | Oyama et al. |
| 2004/0216086 A1 | 10/2004 | Bau |
| 2004/0225995 A1 | 11/2004 | Marvin et al. |
| 2004/0260715 A1 | 12/2004 | Mongeon et al. |
| 2005/0050068 A1 | 3/2005 | Vaschillo et al. |
| 2005/0223392 A1 | 10/2005 | Cox et al. |
| 2005/0256935 A1 | 11/2005 | Overstreet et al. |
| 2005/0278585 A1 | 12/2005 | Spencer |
| 2006/0085797 A1 | 4/2006 | Connelly |
| 2006/0206856 A1 | 9/2006 | Breeden et al. |
| 2006/0234678 A1 | 10/2006 | Juitt et al. |
| 2007/0038500 A1 | 2/2007 | Hammitt et al. |
| 2007/0174486 A1* | 7/2007 | Holstege ..................... 709/246 |

FOREIGN PATENT DOCUMENTS

| | | |
|---|---|---|
| EP | 1 006 443 A2 | 6/2000 |
| EP | 1 061 445 A2 | 12/2000 |
| WO | WO9923558 | 5/1999 |
| WO | 00/29924 | 5/2000 |
| WO | 01/90884 A2 | 11/2001 |

OTHER PUBLICATIONS

"Introducing Microsoft DotNet"; by ChristopheLauer, Jul. 2, 2002; http://web.archive.org/web/20020702162429/http://www.freevbcode.com/ShowCode.asp?ID=2171; pp. 1-10.

C. Moran et al. "*Aries: A Transaction Recovery Method Supporting Fine-Granularity Locking and Partial Rollbacks Using Write-Ahead Logging*", ACM Transaction on Database Systems, vol. 17, No. 1, Mar. 1992, pp. 94-162.

Hewlett-Packard, *HP Application Server*, Technical Guide Version 8.0, HP, Nov. 15, 2001, pp. 1-234.

Sun Microsystems, *IPlanet Application Server 6.0 White Paper*, iPlanet E-Commerce Solutions, May 25, 2000, pp. 1-104.

Enrique Duvos & Azer Bestavros, *An Infrastructure for the Dynamic Distribution of Web Application and Services*, Department of Computer Science Boston University, Dec. 2000, pp. 1-104.

Ed Roman & Rickard Öberg, *The Technical Benefits of EJB and J2EE Technologies over COM+ and Windows DNA*, Enterprise Edition (J2EE) Technologies, Dec. 1999, pp. 1-24.

Marcello Mariucci, *Enterprise Application Server Development Environments*, University of Stuttgart, Oct. 10, 2000, pp. 1-30.

Blake, Rule-Driven Coordination Agent: "A Self-Configurable Agent Architecture for Distributed Control" IEEE, Mar. 2001, pp. 271-277.

Dahalin et al., "Workflow Interoperability Using Extensible Markup Language (XML)" IEEE Jul. 2002, pp. 513-516.

Kunisetty, "Workflow Modeling and Simulation Using an Extensible Object-Oriented Knowledge Base Management System" CiteSeer, 1996, pp. 1-60.

VanDer Aalst et al., Verification of XRL: An XML-Based Workflow Language, IEEE, Jul. 2001, pp. 427-432.

Sall, "XML Syntax and Parsing Concepts", Informit.com, May 31, 2002, pp. 1-25.

Sosnoski, "XML and Java Technologies: Data Binding, Part 1: Code Generation Approaches—JAXB and more", IBM, pp. 1-11, 2003.

Erich Liebmann et al., "Adaptive Data Dissemination and Caching for Edge Service Architectures Built with the J2EE", Mar. 2004, ACM Press, 2004 ACM Symposium on Applied Computing , pp. 1717-1724.

Chen et al., "eCo Architecture for Electronic Commerce Interoperability", Jun. 29, 1999, CommerceNet, pp. 1-107.

Bogunovic, "A Programming Model for Composing Data Flow Collaborative Applications", Proceedings of the IEEE International Conference on Engineering of Computer Based Systems, Mar. 7-12, 1999, pp. 106-112.

Sung, S.Y., et al., "A Multimedia Authoring Tool for the Internet", IEEE 1997, pp. 304-308.

Smith, M., et al., "Marching Towards a Software Reuse Future", ACM Ada Letters, Nov./Dec. 1994, vol. XIV, No. 6, pp. 62-72.

Java Debug Interface—definition, retrieved from <URL http://java.sun.com/j2se/1.4.2/docs/guide/jpda/jdi/overview-summary.html on Feb. 21, 2007, pp. 1-3.

Kilgore, "Multi-Language, Open-Source Modeling Using the Microsoft .NET Architecture," Proceedings of the 2002 Winter Simulation Conference, Dec. 8-11, 2002, pp. 629-633, IEEE, vol. 1.

Embury, et al., "Assisting the Comprehension of Legacy Transactions," Proceedings of the Eighth Working Conference on Reverse Engineering, Oct. 2-5, 2001, pp. 345-354.

Mays, et al., "A Persistent Store for Large Shared Knowledge Bases," IEEE Transactions on Knowledge and Data Engineering, vol. 3, No. 1, Mar. 1991, pp. 33-41.

Tang, et al., "Integrating Remote Invocation and Distributed Shared State," Proceedings of the 18th International Parallel and Distributed Processing Symposium, (IPDPS '04), Apr. 26-30, 2004, 10 pages.

Bea, "Transforming Data Using Xquery Mapper", 2006, BEA AquaLogic Service Bus 2.0 Documentation, pp. 1-19.

Stylus Studio, Xquery Mapper, http://www.stylusstudio.com/xquery_mapper.html, Jun. 5, 2007. pp. 1-6.

Altova, "XML-to-XML Mapping", 2007, pp. 1-3.

Jamper, "Jamper-Java XML Mapper", Jun. 6, 2007, http://jamper.sourceforge.net, pp. 1-4.

Alonso, G. et al., "Advanced Transaction Models in Workflow Contexts," Feb. 1996, IEEE Proceedings of 12th International Conference on Data Engineering, retrieved from: http://citeseer.ist.psu.edu/alonso96advanced.html, 8 pages.

Van Der Aalst, W.M.P. et al., "XML Based Schema Definition for Support of Inter-Organizational Workflow," 2000, University of Colorado and University of Eindhoven report, retrieved from: http://citeseer.ist.psu.edu/vanderaalst00xml.html, pp. 1-39.

Plaindoux, D., "XML Transducers in Java," May 2002, The Eleventh International World Wide Web Conference, retrieved from: http://www.2002.org/CDROM/poster/132/index.html, pp. 1-6.

Microsoft, "Microsoft.net Framework," 2001, Microsoft Corporation, pp. 1-50.

Willink, E., "Meta-Compilation for C++," Jan. 2000, University of Surrey, p. 362.

Allamaraju et al., "Professional Java Server Programming J2EE 1.3 Edition," Sep. 2001, WROX, XP002442953, ISBN: 1-861005-37-7, pp. 1009-1057.

Sun Microsystems, "J2EE Connector Architecture 1.0," Aug. 2001, XP002442954, retrieved from the Internet: URL: http://java.sun.com/j2ee/connector/download.html, pp. 1-179.

Supplementary European Search.Report for EP 02784131.1 dated Aug. 8, 2007, 3 pages.

Muller, "Event-Oriented Dynamic Adaptation of Workflows: Model, Architecture, and Implementation," 2002, University of Leipzig, Germany, pp. i-viv, 1-342.

Peltz, "Web Services Orchestration: a review of emerging technologies, tools, and standards," HP, Jan. 2003, Hewlett Packard, Co., pp. 1-20.

Ort et al., "Java Architecture for XML Binding (JAXB)," Mar. 2003, Java-Sun, pp. 1-14.

Wikipedia, "Java Architecture for XML Binding (JAXB)," Oct. 2007, pp. 1-3.

Shannon, "Java 2 Platform Enterprise Edition Specification," Oct. 20, 2000, v1.3, Sun Microsystems, Inc., Chapters 1-11, 170 pages.

Sun Microsystems, Java Message Service Version 1.0.2b, Aug. 27, 2001, pp. 1-118.

XAResource (Java 2 Platform EE v1.4), Interface XAResource, Dec. 12, 2002, pp. 1-9.

FOLDOC, Definition of JMS, http://foldoc.org/?JMS, Jun. 22, 2001, 1 page.

Newcomer, E., Understanding Web Services: XML, WSDL, Soap and UDDI, May 2002, pp. 1-359.

* cited by examiner

SYSTEM AND METHOD FOR IMPLEMENTING A SCHEMA OBJECT MODEL IN APPLICATION INTEGRATION

CLAIM OF PRIORITY

This application claims priority to U.S. Provisional Patent Application No. 60/347,919, filed Oct. 18, 2001, entitled "APPLICATION VIEW," as well as Application No. 60/347,901, filed Oct. 18, 2001, entitled "EVENT ADAPTER," each of which is hereby incorporated herein by reference.

CROSS-REFERENCED CASES

The following applications are cross-referenced and incorporated herein by reference:

U.S. patent application Ser. No. 10/271,194 entitled "APPLICATION VIEW COMPONENT FOR SYSTEM INTEGRATION," by Mitch Upton, filed Oct. 15, 2002.

U.S. patent application Ser. No. 10/271,162 entitled "SYSTEM AND METHOD FOR PROVIDING A JAVA INTERFACE TO AN APPLICATION VIEW COMPONENT," by Mitch Upton, filed Oct. 15, 2002.

U.S. patent application Ser. No. 10/271,244 entitled "SYSTEM AND METHOD FOR INVOKING BUSINESS FUNCTIONALITY FOR A WORKFLOW," by Mitch Upton, filed Oct. 15, 2002.

U.S. patent application Ser. No. 10/271,414 entitled "SYSTEM AND METHOD FOR USING WEB SERVICES WITH AN ENTERPRISE SYSTEM," by Mitch Upton, filed Oct. 15, 2002.

U.S. patent application Ser. No. 10/271,157 entitled "SYSTEM AND METHOD FOR IMPLEMENTING AN EVENT ADAPTER," by Mitch Upton, filed Oct. 15, 2002.

U.S. patent application Ser. No. 10/271,156 entitled "SYSTEM AND METHOD USING A CONNECTOR ARCHITECTURE FOR APPLICATION INTEGRATION," by Mitch Upton, filed Oct. 15, 2002.

U.S. patent application Ser. No. 10/271,402 entitled "SYSTEM AND METHOD UTILIZING AN INTERFACE COMPONENT TO QUERY A DOCUMENT," by Mitch Upton, filed Oct. 15, 2002.

U.S. patent application Ser. No. 10/271,423 entitled "SYSTEM AND METHOD USING ASYNCHRONOUS MESSAGING FOR APPLICATION INTEGRATION," by Mitch Upton, filed Oct. 15, 2002.

U.S. patent application Ser. No. 10/271,423 entitled "SYSTEM AND METHOD USING ASYNCHRONOUS MESSAGING FOR APPLICATION INTEGRATION," by Mitch Upton, filed Oct. 15, 2002.

U.S. patent application Ser. No. 10/271,410 entitled "SYSTEM AND METHOD FOR IMPLEMENTING A SERVICE ADAPTER," by Mitch Upton, filed Oct. 15, 2002.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The invention relates generally to systems and methods for integrating applications.

BACKGROUND OF THE INVENTION

E-commerce has become a major driving factor in the new economy. To be successful in the long-term, e-commerce will require many companies to engage in cross-enterprise collaborations. To achieve cross-enterprise integration, a company must first integrate its internal applications. Using existing technology and tools, application integration can be an expensive proposition. No integration solution exists that is easy to use, affordable, and based on industry standards. Neither does a solution exist that is based on an industry standard infrastructure, has universal connectivity, is capable of massive scalability, and has accessible business process tools.

Application integration to this point has been very inward-focused. Many existing integration systems have not focused on integrating applications between enterprises. Even when integration solutions were used for cross-enterprise integration, the solutions were still narrowly focused and aimed at vertical markets. This inward focus did little to help companies field external business-to-consumer and business-to-business applications, such as applications that can utilize the Internet to generate revenue and reduce costs. The requirement for Internet-enabled applications led to the rise of the application server market. To date, application servers have primarily been used to host external applications targeted at customers and partners. Application servers are themselves packaged applications that, instead of solving a specific problem, are general-purpose platforms that host vertical solutions.

The first attempts at application integration were primarily focused on low-level implementation details such as the format of the data, the byte ordering between machines, and character encoding. The focus on low-level data formats was necessary because, for the first generation of application integration solutions, there were no widely adopted standards for data encoding that could be deployed across multiple vertical applications.

The traditional approach involved connecting individual systems to, in effect, hardwire the systems together. This approach can be complex, as connecting different systems can require an intimate, low-level knowledge of the proprietary technologies of multiple systems.

Present integration systems, which have moved away from "hardwiring" systems together, still suffer from a lack of standards. Each integration vendor typically provides a proprietary solution for application integration, message transformation, message formats, message transport, and routing. Not one of these systems to date has achieved significant market share to enable its technologies to become the de-facto standard. This lack of standards has given packaged application vendors little incentive to integrate these systems with their. Further, each of these integration systems or servers has its own proprietary API, such that packaged application vendors cannot leverage development beyond a single integration server. This fragmentation of the integration market has provided little financial incentive for third parties.

SUMMARY OF THE INVENTION

Systems and methods in accordance with embodiments of the present invention allow communication to be passed between components, such as an enterprise system and a client application, by taking advantage of schemas. A schema can be used to ensure that a communication, such as a request or response, is in the proper format for one of the components. For instance, metadata can be received from an enterprise system in response to a request from a client application. That metadata can be transformed to a response document that conforms to a schema. The document can be validated against the schema and passed on to the client application.

Other features, aspects, and objects of the invention can be obtained from a review of the specification, the figures, and the claims.

DETAILED DESCRIPTION OF THE INVENTION

Figure 1:
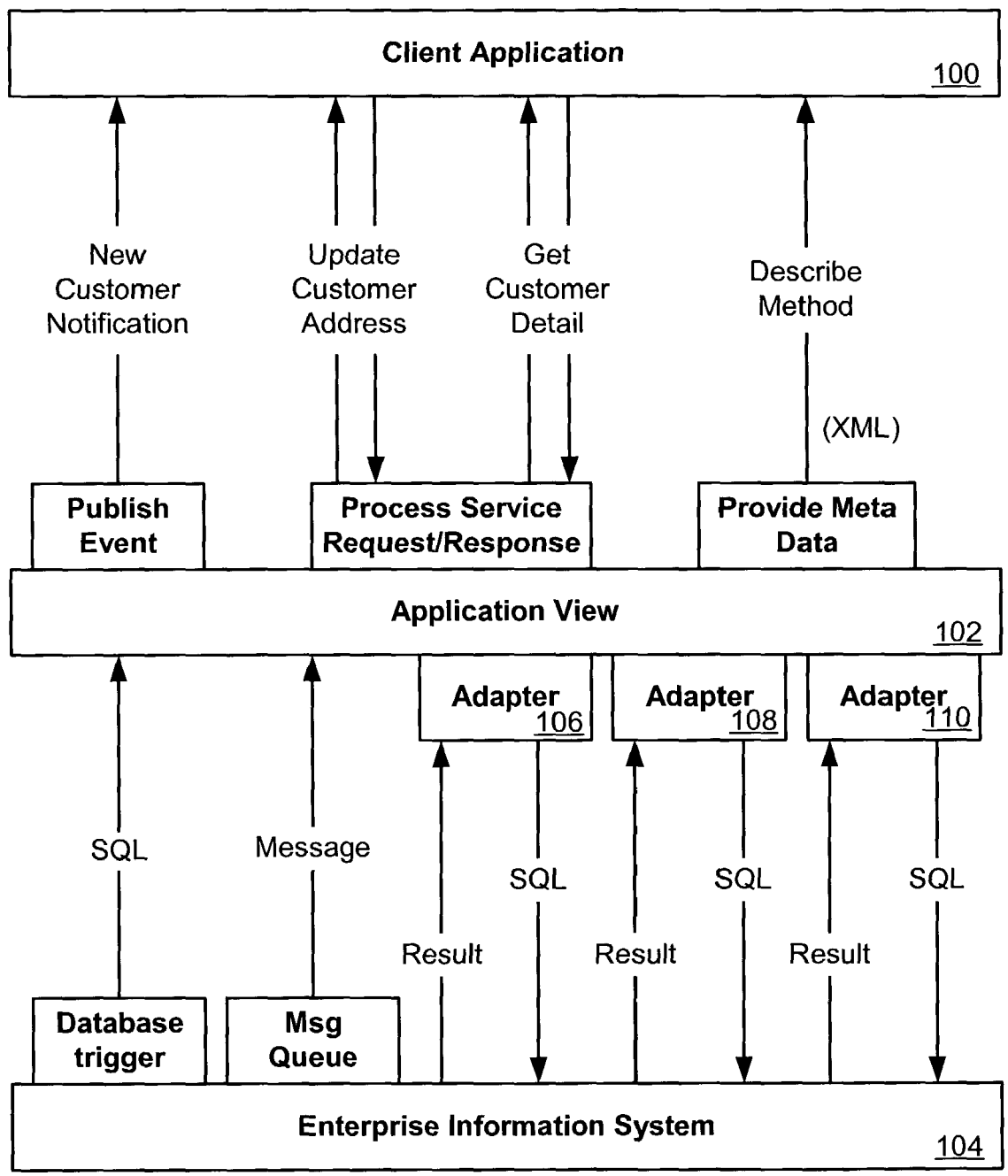
FIG. 1 is a diagram of an integration system that can be used in accordance with one embodiment of the present invention.

Application integration components can be used to integrate a variety of applications and systems, such as Enterprise Information Systems (EISs). Information technology (IT) organizations typically utilize several highly-specialized applications. Without a common integration platform to facilitate application-level integration, these applications cannot be integrated without extensive, highly-specialized development efforts.

Application integration can utilize adapters to establish an enterprise-wide, united framework for integrating any current or future application. Adapters can simplify integration efforts by allowing each application to be integrated with an application server, instead of requiring that each application being integrated with every other application.

The development and widespread acceptance of standards such as the Java 2 Platform, Enterprise Edition (J2EE) from Sun Microsystems, Inc. of Santa Clara, Calif., as well as the extensible Markup Language (XML), has laid the groundwork for a standardized approach to the development of these adapters. Perhaps the most significant of these standards for application integration is the J2EE Connector architecture. The J2EE Connector architecture provides a standardized approach for the development of adapters for all types of applications, from legacy mainframe applications, such as CICS from IBM, to packaged applications such as PeopleSoft, Siebel, and SAP. The adoption of such standards enables businesses to develop adapters that work on any J2EE-compliant application server, for example.

Integration Architecture

Application integration can build on this standardized approach in an application integration framework by providing a standards-based architecture for hosting J2EE Connector architecture-based adapters. Developers can build J2EE Connector architecture-compliant adapters and deploy these adapters, in the integration framework, to connect enterprise applications to an application server.

These adapters can be used to define business-focused interfaces to an EIS, the interfaces referred to herein as "application views" of the respective adapters. An application view can provide a simple, self-describing, consistent interface to services and events in an application. Application views can make use of an adapter for an EIS, making it possible to expose existing information systems as business services.

Unlike adapters, however, an application view does not require users to have intimate knowledge of the EIS or the client interface for that EIS, such that non-programmers or technical analysts can use application views. An application view can provide a business-oriented way for business analysts to access enterprise data without worrying about the programmatic details defined in an adapter. These same users may be otherwise unable to use an adapter directly, due to a lack of familiarity with the EIS.

An application integration component directed at enterprise application integration can have several primary aspects. If the functionality of an EIS such as a PeopleSoft system or an SAP system is to be invoked, an implementation of the J2EE Connector Architecture can be used. If something occurs inside an EIS system, such as a trigger going off, an event can be generated. This event may, in some embodiments, need to be communicated to an external application. An event architecture in an application integration component can handle this communication.

Application Views

An application view can provide significant value to an application integration component. An application view can abstract away much of the complexity in dealing with an application, such as a backend EIS system. Application views can also simplify the way in which adapters are accessed. Application views can provide a layer of abstraction, for example, between an adapter and the EIS functions exposed by that adapter. Instead of accessing an EIS by direct programming a user can simply: edit an adapter's application views, create new application views, or delete any obsolete application view(s). A layer of abstraction formed by application views can help non-programmers maintain the services and events exposed by an adapter. Each application view can be specific to a single adapter, and can define a set of business functions on that adapter's EIS. After an adapter is created, a Web-based interface for the adapter can be used to define application views.

If an application view is used as a primary user interface for an adapter, a number of features can be included that are not commonly found in existing enterprise application integration technologies. Application views can, for example, use XML as a common language among applications. Service and event definitions can be used to expose application capabilities. XML schemas can be used to define the data for services and events. Bidirectional communication can also be supported in adapters.

An application view can be an integral part of an integration framework. An application view can provide a view of the application capabilities exposed by an adapter that a user can customize to meet specific needs. A user can tailor an application view, for example, for a specific business purpose. As a result, the application view can provide an effective alternative to the "one size fits all" approach that many applications provide for the design of a client interface. An application view can be defined for only the business or other capabilities that are applicable for a specific purpose. The capabilities can be customized such as by naming, describing, and defining the data requirements.

In one example, shown in FIG. 1, adapters 106, 108, 110 can be developed that allow a client application 100 to communicate with an Enterprise Information System 104 through the use of an application view 102. A developer can begin by coding an adapter that exposes the functionality in the enterprise application that accesses enterprise data. The functionality the adapter exposes could, for example, update records in a database using SQL statements, or could request information from an SAP system using its BAPI or IDOC interfaces. A business analyst, working with the developer, can then define an application view of the adapter using an application view interface.

Figure 2:
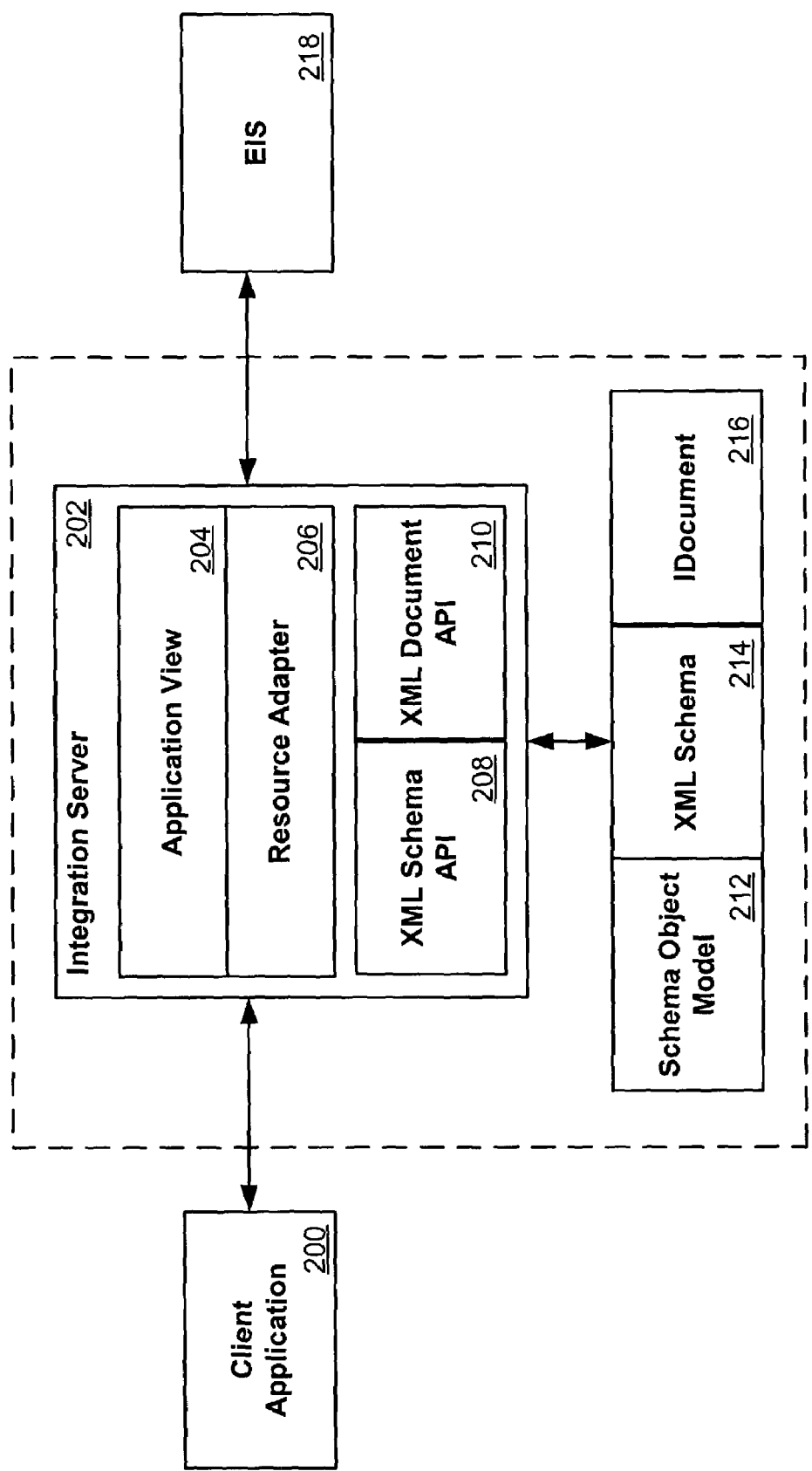
FIG. 2 is a diagram of an integration system that can be used in accordance with another embodiment of the present invention.

Another example of a system is shown in FIG. 2. In this figure, a client application 200 can communicate with an EIS 218 through an integration server 202. The integration server can be, for example, a web server or application server 202, and can be included in a cluster or integration system, represented here by the dotted line. The integration server can include an application view component 204 and a resource adapter 206 for the EIS 218. An XML schema API 208, useful in generating an XML schema 214 for the client application 200 using the schema object model 212 can be included in the integration server 202. An XML document API 210, which can provide an interface to an XML document using an IDocument component 216 such as IDoc class libraries, for example, can also be included on the integration server 202. The schema object model 212, XML, schema 214, and IDocument component 216 do not need to be contained on the integration server 202, but should be accessible to the integration server.

An application view is an object, which can be implemented in one embodiment as a stateless session JavaBean. There can be a Java interface to the application view for the client application. A Java application can be custom coded to use that object, such as by passing XML in and receiving XML back. In addition, a business process manager component can be included that allows process engineers to define workflows, and allows application views to be invoked as business services. In a workflow, a callout can be made to an EIS to get information such as a customer's credit record. The fact that the application view is a Java object or enterprise JavaBean can be hidden from the process and designer.

A web services interface can also be used with an application view. A protocol such as SOAP can be used to invoke a web service. Another protocol that may be used includes UDDI, a platform-independent, open framework for describing services, discovering businesses, and integrating business services using the Internet. A WSDL protocol can also be used, which is an XML format for describing network services. A web services layer can be provided on top of the application view so that any application view can be invoked as a web service.

In application integration, new application views can be hot-deployed against an existing EIS through a web-based interface. An application view is hot-deployed when it is deployed with the system running, without restarting the destination server. A new customer management tool for SAP, for example, can also be defined through a web browser.

Integration Framework

Application integration can utilize an integration framework, which can provide a systematic, standards-based architecture for hosting application views. Features of such a framework can include application views for exposing application functions and design-time graphical user interfaces (GUIs), such as web-based interfaces that can be used for creating application views. The integration framework utilizes adapters, instead of "hardwiring" enterprise systems together. Once an adapter is deployed for an EIS, other components and applications can use that adapter to access data on the EIS.

A framework in accordance with one embodiment of the present invention relies on XML as the standard format for messages. XML includes XSLT, a standard for transforming XML documents into other XML documents. XSLT is designed for use as part of XSL, which is a stylesheet language for XML. In XSLT, an XML document is used to specify the operations to perform on a class of XML documents in order to transform the documents' structure and content. An XSLT transformation can make use of any of the operations built into the Java programming language, or can make use of custom operations written either in Java or in native code. An integration framework allows a business process to invoke an XSLT engine in order to transform XML messages.

An integration framework can also rely on standards for transporting messages such as Java Message Service (JMS) and HTTPS. JMS is a standard API for interfacing with message transport systems. Using JMS, a framework can utilize any message transport mechanism that provides a JMS interface. The J2EE Connector architecture standard does not specify a message transport mechanism, but an application integration framework can specify such a transport mechanism.

An integration framework can be based on an existing standard infrastructure, such as an application server that supports J2EE, JMS, and the J2EE Connector architecture. Using such a standard infrastructure also provides for high availability and scalability, such as by clustering and resource pooling. The framework can provide for universal connectivity by enabling the construction of XML-based application adapters that can connect to any legacy and packaged application. An adapter development kit can be used to allow users such as customers, system integrators, and packaged application vendors to quickly develop J2EE connector architecture-compliant and integration framework-based adapters. The framework can utilize XML, which means that the same data format can be used for both within- and between-enterprise integration, since many e-commerce systems use XML as the standard message format.

An integration framework can also utilize a business-process engine to allow non-programmers to graphically construct and maintain business processes. An integration framework can implement a common model on top of the J2EE Connector architecture that is focused on business-level concepts. This model, which can consist of XML-encoded events and services, allows the management of a consistent integration environment, regardless of the interface required between adapters and their target applications. The business processes can react to events generated by applications, and they can invoke an application's functionality via services that are exposed by an application adapter.

Adapter Development

XML development tools, such as may be included in an ADK, can be considered part of a metadata support layer for a design-time framework. These tools, which can comprise an XML Toolkit, can include an XML schema API, which can be characterized by a Schema Object Model (SOM). This API can be used to programmatically build XML schemas. An adapter can call an enterprise system or EIS for specific request and response metadata, which can then be programmatically transformed into an XML schema. The SOM is a set of tools that can extract many of the common details, such as syntactical complexities of XML schema operations so that a user can focus on its more fundamental aspects. Another tool that can be included is an XML Document API, which can be characterized by IDocument. This API can provide an x-path interface to a document object model (DOM) document.

An IDocument, which can facilitate XML input and output from the CCI layer in an adapter, is a higher-order wrapper around the W3C Document Object Model (DOM). The primary value-add of the IDocument interface is that it provides an XPath interface to elements in an XML document. In other words, IDocument objects are queryable and updatable using XPath strings. For example, the following XML document describes a person named "Bob" and some of the details about "Bob."

```
<Person name="Bob">
    <Home squareFeet="2000"/>
    <Family>
        <Child name="Jimmy">
            <Stats gender="male" hair="brown" eyes="blue"/>
        </Child>
        <Child name="Susie">
            <Stats gender="female" hair="blonde" eyes="brown"/>
        </Child>
    </Family>
</Person>
```

By using IDocument, Jimmy's hair color can be retrieved using code such as:

```
System.out.println("Jimmy's hair color: " +
person.getStringFrom("//Person[@name=\"Bob\"]/Family/Child
[@name\"Jimmy\"]/Stats/@hair");
```

On the other hand, if DOM is used it would be necessary to use code such as:

```
String strJimmysHairColor = null;
org.w3c.dom.Element root = doc.getDocumentElement( );
if (root.getTagName( ).equals("Person") &&
    root.getAttribute("name").equals("Bob") {
        org.w3c.dom.NodeList list = root.
            getElementsByTagName("Family");
        if (list.getLength( ) > 0) {
            org.w3c.dom.Element family = (org.w3c.dom.
                Element)list.item(0);
            org.w3c.dom.NodeList childList =
                family.getElementsByTagName("Child");
            for (int i=0; i < childList.getLength( ); i++) {
                org.w3c.dom.Element child = childList.item(i);
                if (child.getAttribute("name").equals("Jimmy")) {
                    org.w3c.dom.NodeList statsList =
                        child.getElementsByTagName("Stats");
                    if (statsList.getLength( ) > 0) {
                        org.w3c.dom.Element stats = statsList.item(0);
                        strJimmysHairColor = stats.getAttribute("hair");
                    }
                }
            }
        }
}
```

XCCI Design Pattern

A common design pattern that emerges when using an XCCI approach is to support the definition of services in an interaction implementation. In other words, a javax.resource.cci.Interaction implementation for an adapter can allow a client program to retrieve metadata from an underlying EIS in order to define an Integration service. Specifically, this means that the interaction must be able to generate the request and response XML schemas and additional metadata for a service. Additionally, the Interaction could also allow a client program to browse a catalog of functions provided by the EIS. This approach facilitates a thin client architecture for an adapter.

Data Transformation Method

Data transformation is the process of taking data from an enterprise system and transforming the data into an XML schema that can be read by the application server. For each event, a schema can define what the XML output looks like. This can accomplished by using SOM and IDocument class libraries.

The following sample code listings show one data transformation sequence. The following code can be used to transform data from an EIS into an XML schema:

```
SOMSchema schema = new SOMSchema( );
SOMElement root = new SOMElement("SENDINPUT");
SOMComplexType mailType = new SOMComplexType( );
root.setType(mailType);
SOMSequence sequence = mailType.addSequence( );
SOMElement to = new SOMElement("TO");
to.setMinOccurs("1");
to.setMaxOccurs("unbounded");
sequence.add(to);
SOMElement from = new SOMElement("FROM");
from.setMinOccurs("1");
from.setMaxOccurs("1");
sequence.add(from);
SOMElement cc = new SOMElement("CC");
cc.setMinOccurs("1");
cc.setMaxOccurs("unbounded");
sequence.add(cc);
SOMElement bcc = new SOMElement("BCC");
bcc.setMinOccurs("1");
bcc.setMaxOccurs("unbounded");
sequence.add(bcc);
SOMElement subject = new SOMElement("SUBJECT");
subject.setMinOccurs("1");
subject.setMaxOccurs("1");
sequence.add(bcc);
SOMElement body = new SOMElement("BODY");
if (template == null)
    { body.setMinOccurs("1");
        body.setMaxOccurs("1");
    }else
        { Iterator iter = template.getTags( );
            if (iter.hasNext( ))
            { SOMComplexType bodyComplex =
            new SOMComplexType( );
                body.setType(bodyComplex);
            SOMAll all = new SOMAll( );
            while (iter.hasNext( ))
            { SOMElement eNew =
            new SOMElement((String)iter.next( ));
                all.add(eNew);
            }//endwhile
            bodyComplex.setGroup(all);
            }//endif
        }//endif
sequence.add(body);
schema.addElement(root);
```

The following example shows an XML schema created by the above code:

```
<xsd:schema xmlns:xsd="http://www.w3.Org/2001/XMLSchema">
    <xsd:element name="SENDINPUT">
        <xsd:complexType>
            <xsd:sequence>
                <xsd:element name="TO" maxOccurs="unbounded"
                    type="xsd: string"/>
                <xsd:element name="FROM" type="xsd:string"/>
                <xsd:element name="CC" maxOccurs="unbounded"
                    type="xsd:string"/>
                <xsd:element name="BCC" maxOccurs=
                    "unbounded" type= "xsd:string"/>
                <xsd:element name="BCC" maxOccurs="unbounded"
                    type="xsd:string"/>
                <xsd:element name="BODY" type="xsd:string"/>
            </xsd:sequence>
        </xsd:complexType>
</xsd:element>
```

The following example shows a valid XML document created by the schema shown above:

```
</xsd:schema>
<?xml version="1.0"?>
<!DOCTYPE SENDINPUT>
<SENDINPUT>
    <TO/>
    <FROM/>
    <CC/>
    <BCC/>
    <BCC/>
    <BODY/>
</SENDINPUT> <xsd:schema xmlns:xsd =
"http://www.w3.org/2001/XMLSchema">
```

The adapter can be tested and then deployed. An adapter can be deployed manually, or through a tool such as a server or integration console.

XML Toolkit

An XML toolkit can be utilized that can help to develop valid XML documents to transmit information from a resource or enterprise system to an application on the other side of an adapter. The toolkit can incorporate many of the operations required for XML manipulation into a single location, relieving the user of these often tedious chores.

An XML toolkit can be comprised primarily of two Java packages, such as a com.document package and a com.schema package. These packages can include complete Javadocs for each class, interface, and method.

IDOC

An IDocument, or IDoc, is a container that combines the W3C Document Object Model (DOM) with an XPath interface to elements in an XML document. This combination can make IDocument objects queryable and updatable simply by using XPath strings. These strings can eliminate the need to parse through an entire XML document to find specific information by allowing a user to specify just the elements the user wants to query and then returning the values of those queries.

An IDocument can be a public interface that represents an XML document. An IDocument can provide a document type name, which can be used to refer to a description of its structure and usage. In addition, IDocuments can be mutable, and can provide methods for retrieving, modifying, adding, and removing data elements. All IDocument objects can be queryable, and can be updatable such as by using XPath strings. Also, IDocument instances can be serializable to, and un-serializable from, XML. IDocument objects can implement a Java interface such as java.io.Serializable.

The default representation of the document represented by an IDocument can be a W3C DOM instance, such as org.w3c.dom.Document. The IDocument may at times be in an unparsed state. This can happen if the IDocument was explicitly constructed this way, by using a method such as DocumentFactory.createDocument (String, boolean), for example, where the boolean argument is 'true.' The internal state of an IDocument can be determined using a method such as isparsed( ). If this returns true, then the content of the document has been parsed into a DOM. If 'false' is returned, the IDocument may contain just the raw XML text.

In cases where an IDocument is in an unparsed state, the content can be parsed using a SAX parsing scheme that allows a user to build an in-memory representation of the document that is not DOM. A method such as from XML (ContentHandler) can be used for this purpose, allowing a user to parse the document's content manually using an interface such as an implementation of a ContentHandler interface. A user could achieve similar results by getting the raw content from the IDocument and creating/invoking a custom SAX parser.

IDocument can simplify the code necessary to query and find information in a document, as opposed to code such as DOM code. For example, the following XML document describes a person named "Bob" and some of the details about "Bob":

```
<Person name="Bob">
    <Home squareFeet="2000"/>
    <Family>
        <Child name="Jimmy">
            <Stats sex="male" hair="brown" eyes="blue"/>
        </Child>
        <Child name="Susie">
            <Stats sex="female" hair="blonde" eyes="brown"/>
        </Child>
    </Family>
</Person>
```

In order to retrieve Jimmy's hair color from the <child> element by using IDocument, an XPath string can be created that seeks exactly that information, as shown the following IDocument data retrieval code sample:

System.out.println("Jimmy's hair color:"+person.getStringFrom ("//Person[@name="\Bob\"]/Family/Child [@name="\Jimmy\"]/Stats/@hair");

Schema Object Model (SOM)

Figure 3:
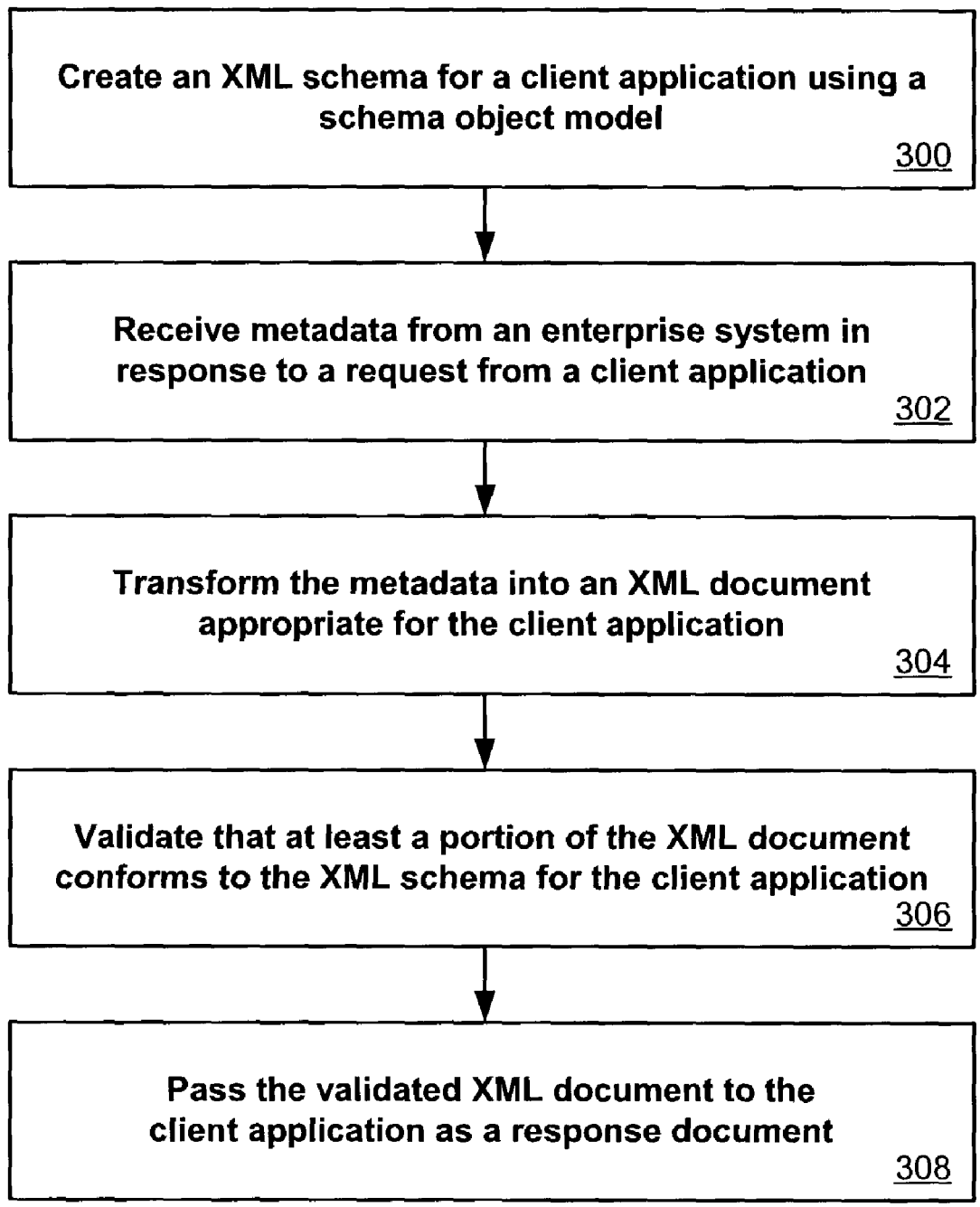
FIG. 3 shows a method that can be used with the systems of FIGS. 1 and 2.

A schema object model (SOM) is an interface useful for programmatically building schemas, such as XML schemas. SOM can comprise a set of tools that can extract and validate many of the common details, such as syntactical complexities of schema, so that a user can focus on more fundamental aspects. As shown in the method of FIG. 3, for example, an XML schema can be created for a client application using a schema object model 300. A component such as a resource adapter can call into an EIS for specific request/response metadata. Metadata can be received from the EIS in response to the request 302, which can be programmatically transformed into an XML document that conforms to the XML schema for the client application 304. At least a portion of the XML document can be validated against the XML schema for the client application 306. An IDocument interface can be used to parse and/or retrieve elements or portions from the XML document in order to validate those elements or portions. Once the XML document is validated, it can be passed to the client application as a response document 308.

Figure 4:
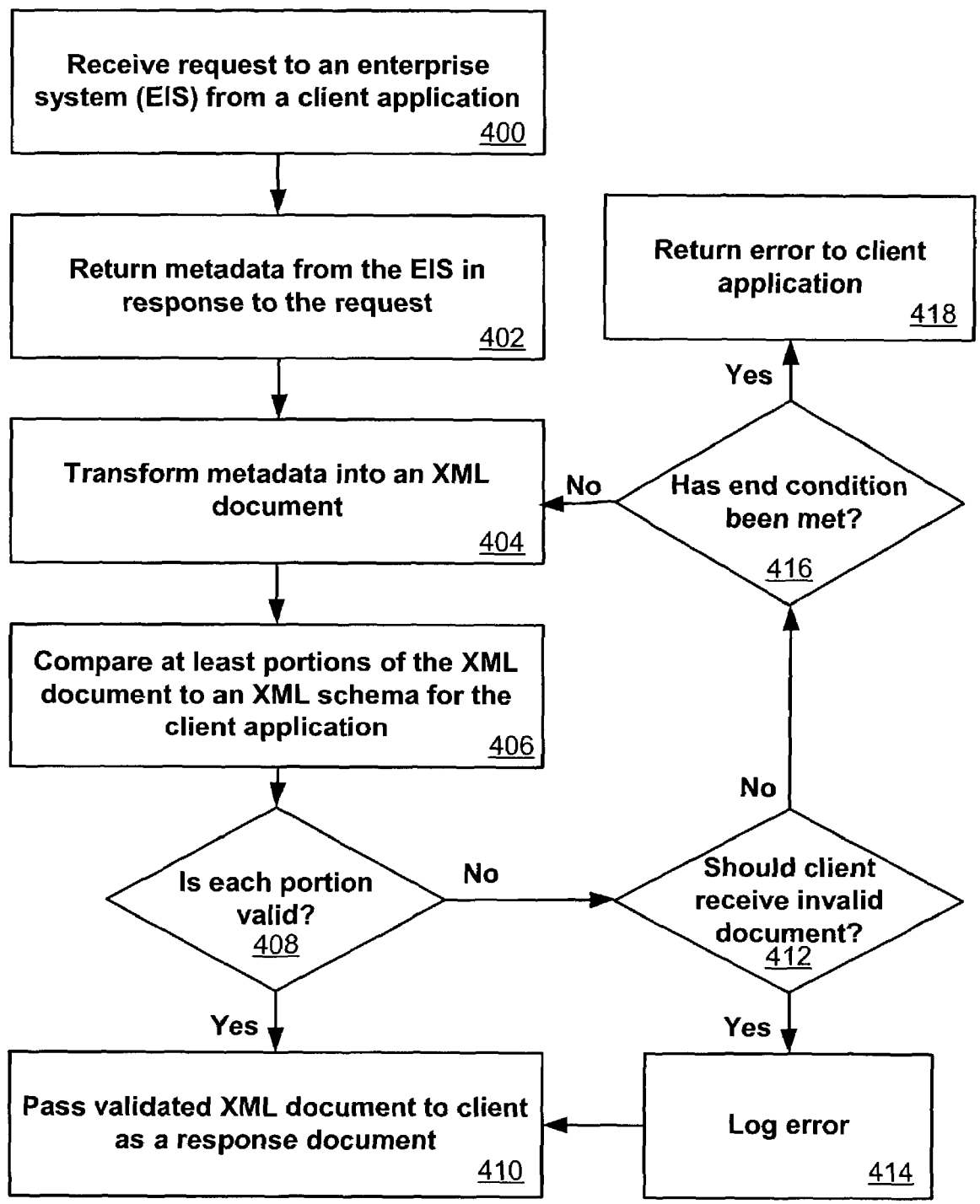
FIG. 4 is a flowchart showing a process that can be used with the systems of FIGS. 1 and 2.

A flowchart for such a method is shown in FIG. 4. The request is received from the client application to an EIS 400. The EIS returns metadata in response to the request 402. The metadata is transformed into an XML document 404. At least portions of the XML document can be parsed or extracted, such as by using an IDocument interface, and can be compared to the XML schema for the client application in order to validate those portions 406. A determination is made as to whether each portion is valid 408. If each portion is valid, the validated XML document can be returned to the client as a response document 410. If each portion is not valid, a determination should be made whether the client application should receive invalid documents 412. If the client should receive an invalid document, each error can be logged 414 and the validated (or invalidated) XML document is passed to the client as a response document 410.

If the client should not receive an invalid XML document, a determination should be made whether an end condition has been met 416. An end condition can be set so that an infinite loop is not created if the metadata cannot be transformed into a valid XML document. "Valid" in this instance means that the XML document is valid against the XML schema, not that the document is a valid XML document. The client application may receive a document that conforms to the XML schema but that is not a proper XML document. If the end condition has not been met, another attempt can be made to transform the metadata into an XML document 404. If the end condition has been met, such as a number of iterations or timeout period end being reached, an error can be returned to the client application and processing of this request can stop 418.

An XML schema is like a contract between the EIS and an application on the other side of the adapter. This contract can specify how data coming from the EIS must appear in order for the application to manipulate it. A document, or an XML-rendered collection of metadata from an EIS, can be considered valid if it meets the rules specified in the schema, regardless of whether or not the XML is correct. For example, if a schema required a name to appear in a <name> element and that element required two child elements, such as <firstname> and <lastname>, to be valid, the document from the EIS would have to appear in a form such as:

```
<name>
    <firstname>Joe</firstname>
    <lastname>Smith</lastname>
</name>
``` and the schema would have to appear in a form such as:

```
<schema>
    <element name="name">
        <complexType>
            <sequence>
                <element name="firstname" />
                <element name="lastname" />
            </sequence>
        </complexType>
    </element>
</schema>
```

No other form of <name></name>, such as "<name>Joe Smith</name>" would be valid, even though the XML is correct.

Creating the Schema

An XML schema can be created programmatically by using the classes and methods provided with SOM. One benefit of using such a tool is that it allows a user to tailor a schema for that user's needs simply by populating the variables in the program components. For instance, the following code examples create a schema that validates a purchase order document:

```
import com.bea.schema.*;
import com.bea.schema.type.SOMType;
    public class PurchaseOrder
    {
        public static void main(String[ ] args)
```

-continued

```
        {
            System.out.println(getSchema( ).toString( ));
        }
        public static SOMSchema getSchema( )
        {
            SOMSchema po_schema = new SOMSchema( );
            po_schema.addDocumentation("Purchase order schema for
                Example.com.\nCopyright 2000 Example.com.\nAll rights
                reserved.");
            SOMElement purchaseOrder =
                po_schema.addElement("purchaseOrder");
            SOMElement comment =
                po_schema.addElement("comment");
            SOMComplexType usAddress =
                po_schema.addComplexType("USAddress");
            SOMSequence seq2 = usAddress.addSequence( );
        // adding an object to a SOMSchema defaults to type="string"
            seq2.addElement("name");
            seq2.addElement("street");
            seq2.addElement("city");
            seq2.addElement("state");
            seq2.addElement("zip", SOMType.DECIMAL);
```

One benefit to such a tool is that it is only necessary to populate the variables in the program components to tailor a schema for particular needs. Attributes can be set in the same way that elements are created, such as:

```
SOMAttribute country_attr =
    usAddress.addAttribute("country",
    SOMType.NMTOKEN);
    country_attr.setUse("fixed");
    country_attr.setValue("US");
```

To correctly set these attributes, their addressability should be maintained. Like complexTypes, simpleTypes can be added to the root of the schema, such as:

```
SOMSimpleType skuType = po_schema.addSimpleType("SKU");
SOMRestriction skuRestrict = skuType.addRestriction
    (SOMType.STRING);
skuRestrict.setPattern("\\d{3}-[A—Z]{2}");
    SOMComplexType poType =
        po_schema.addComplexType("PurchaseOrderType");
    purchaseOrder.setType(poType);
    poType.addAttribute("orderDate", SOMType.DATE);
```

The addSequence( ) method of a SOMComplexType object can return a SOMSequence reference, allowing a user to modify the element that was added to the element. In this way objects can be added to the schema, such as by implementing an addSequence( ) method to modify an element:

SOMSequence poType_seq=poType.addSequence( );
poType_seq.addElement("shipTo", usAddress);
poType_seq.addElement("billTo", usAddress);

Attributes of an element within a schema can be set by calling setter methods of a SOMElement object. For example, an the implementation of setMinOccurs( ) and setMaxOccurs( ) can be given by:

```
SOMElement commentRef = new SOMElement(comment);
    commentRef.setMinOccurs(0);
    poType_seq.add(commentRef);
SOMElement poType_items = poType_seq.addElement("items");
```

-continued

```
SOMComplexType itemType =
   po_schema.addComplexType("Items");
SOMSequence seq3 = itemType.addSequence( );
SOMElement item = new SOMElement("item");
   item.setMinOccurs(0);
   item.setMaxOccurs(-1);
   seq3.add(item);
SOMComplexType t = new SOMComplexType( );
   item.setType(t);
SOMSequence seq4 = t.addSequence( );
   seq4.addElement("productName");
SOMElement quantity = seq4.addElement("quantity");
SOMSimpleType st = new SOMSimpleType( );
   quantity.setType(st);
SOMRestriction restrict =
   st.addRestriction(SOMType.POSITIVEINTEGER);
   restrict.setMaxExclusive("100");
```

In this example, the items element for PurchaseOrderType was created before Items type. The reference can be created and the type set once the Items type object is available, such as by using:

poType_items.setType(itemType);

An element can also be added to the schema. Adding an element can be done by implementing an addElement( ) method of SOMSequence, or the add( ) method from a previously created SOMElement. These methods can be shown by:

```
seq4.addElement("USPrice", SOMType.DECIMAL);
   SOMElement commentRef2 = new SOMElement(comment);
      commentRef2.setMinOccurs(0);
      seq4.add(commentRef2);
   SOMElement shipDate = new SOMElement("shipDate",
   SOMType.DATE);
      shipdate.setMinOccurs(0);
      seq4.add(shipDate);
   t.addAttribute("partNum", skuType);
   return po_schema;
   }
}
```

When running the code shown in the previous examples, the following schema can be created:

```xml
<?xml version="1.0"?>
<!DOCTYPE schema (View Source for full doctype...)>
<xsd:schema xmlns:xsd="http://www.w3.org/2000/XMLSchema">
   <xsd:annotation>
      <xsd:documentation>Purchase order schema for Example.com.
         Copyright 2000 Example.com. All rights
         reserved.</xsd:documentation>
   </xsd:annotation>
   <xsd:simpleType name="SKU">
      <xsd:annotation>
      </xsd:annotation>
      <xsd:restriction base="xsd:string">
         <xsd:pattern value="\d{3}-[A—Z]{2}" />
      </xsd:restriction>
   </xsd:simpleType>
   <xsd:complexType name="PurchaseOrderType">
      <xsd:sequence>
         <xsd:element type="USAddress" name="shipTo" />
         <xsd:element type="USAddress" name="billTo" />
         <xsd:element ref="comment" minOccurs="0" />
         <xsd:element type="Items" name="items" />
      </xsd:sequence>
      <xsd:attribute name="orderDate" type="xsd:date" />
   </xsd:complexType>
   <xsd:complexType name="Items">
      <xsd:sequence>
         <xsd:element maxOccurs="unbounded" name="item"
            minOccurs="0">
            <xsd:complexType>
               <xsd:sequence>
                  <xsd:element type="xsd:string"
                     name="productName"/>
                  <xsd:element name="quantity">
                     <xsd:simpleType>
                        <xsd:restriction base=
                           "xsd:positiveInteger">
                           <xsd:maxExclusive value="100"/>
                        </xsd:restriction>
                     </xsd:simpleType>
                  </xsd:element>
                  <xsd:element type="xsd:decimal" name=
                     "USPrice" />
                  <xsd:element ref="comment"
                     minOccurs="0" />
                  <xsd:element type="xsd:date"
                     name="shipDate" minOccurs="0" />
               </xsd:sequence>
               <xsd:attribute name="partNum" type="SKU" />
            </xsd:complexType>
         </xsd:element>
      </xsd:sequence>
```

-continued

```
</xsd:complexType>
<xsd:complexType name="USAddress">
    <xsd:sequence>
        <xsd:element type="xsd:string" name="name" />
        <xsd:element type="xsd:string" name="street" />
        <xsd:element type="xsd:string" name="city" />
        <xsd:element type="xsd:string" name="state" />
        <xsd:element type="xsd:number" name="zip" />
    </xsd:sequence>
    <xsd:attribute name="country" use="fixed" value="US"
        type="xsd:NMTOKEN" />
</xsd:complexType>
<xsd:element type="PurchaseOrderType" name="purchaseOrder" />
<xsd:element type="xsd:string" name="comment" />
</xsd:schema>
```

Validating an XML Document

Once the schema is created, it can be used to validate a document sent from an EIS. SOM can be used to validate XML DOM documents by using a SOMSchema method such as isValid( ). SOMElement can have a corresponding isValid( ) method for validating an element instead of the DOM document. The isValid( ) method can determine if 'document' or 'element' is valid, and if not, can compile a list of the errors. If the document is valid, isValid( ) can return 'true' and the list of errors can be empty.

An isValid( ) method can be implemented in a number of different ways, including the following ways:
    public boolean isValid(org.w3c.dom.Document doc, java.util.List errorList)
    public boolean isValid(IDocument doc, List errorList)

In this example, "doc" refers to the document instance to be validated, and "errorList" refers to a list of errors found in the document and/or doc.

The isValid( ) method can return a boolean value of 'true' if the document is valid with respect to this schema. If the document is not valid with respect to the schema, isValid( ) can return 'false' and the errorList can be populated. The errorList is a java.util.List for reporting errors found in the document, doc. The error list is cleared before validating the document. Therefore, the list implementation used must support the clear( ) method. If isValid( ) returns false, the error list is populated with a list of errors found during the validation procedure. The items in the list are instances of the class com.bea.schema.SOMValidationException. If isValid( ) returns true, errorList is empty. The following shows an example of an isValid( ) implementation:

```
SOMSchema schema = ...;
IDocument doc = DocumentFactory.createDocument
    (new FileReader(f));
java.util.LinkedList errorList = new
    java.util.LinkedList( );
boolean valid = schema.isValid(doc, errorList);...
if (! valid){
    System.out.println("Document was invalid.
        Errors were:");
    for (Iterator i = errorList.iterator; i.hasNext( );)
    {
        System.out.println(((SOMValidationException)
            i.next).toString( ));
    }
```

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for passing communication between an enterprise system and a client application, comprising:
    receiving a request at an enterprise system from a client application to access data at the enterprise system;
    retrieving data and metadata from the enterprise system, in response to the request from the client application;
    transforming the metadata retrieved from the enterprise system into an XML schema specific to the client application,
        wherein the XML schema includes rules that specify the format of the data required by the client application;
    transforming the data and metadata into an XML document which includes XML data which further includes a plurality of XML elements corresponding to the data and metadata;
    subsequent to transforming the data and metadata, creating a document object that includes the entire contents of the XML document and that provides a queryable document interface to access the XML data therein;
    querying the XML document using the queryable document interface, and extracting only a portion of the XML data that is less than the entirety of the XML data, which includes the XML elements which correspond to the data requested by the client application;
    validating only those XML elements within the extracted portion of the XML data against the XML schema specific to the client application, including ensuring that each XML element within the extracted portion of the XML data satisfies the rules specified by the XML schema as to the format of the data required by the client application, and that the XML data is well-formed;
    if each of the XML elements within the extracted portion of the XML data is determined to be valid then indicating the XML document as being valid against the XML schema specific to the client application; and
    communicating the XML document as a response document to the client application.

2. A method according to claim 1 wherein, the XML schema is programmatically created using a schema object model.

3. A method according to claim 2, wherein the XML schema is programmatically created using classes and methods in the schema object model.

4. A method according to claim 1, further comprising:
creating a schema object model to validate an XML schema for the client application.

5. A method according to claim 1, further comprising:
compiling a list of errors containing elements of the XML document that are not valid.

6. The method of claim 1 wherein the document object can be accessed using an xpath interface, and wherein the extracting includes querying the document object by issuing an xpath command to the xpath interface.

7. The method according to claim 1 wherein, if each of the elements within the portion of the XML data is determined to be valid, then indicating the XML document as being valid against the XML schema associated with the client application that made the request, and communicating the XML document as a validated response document to the client application.

8. The method according to claim 1 further comprising:
determining one or more of the XML elements within the XML data are invalid;
determining whether the client application is operable to receive invalid documents; and
if the client application is operable to receive invalid documents, then communicating the XML document as a response document to the client application.

9. A system for passing communication between an enterprise system and a client application, comprising:
a resource adapter at an enterprise system adapted to receive a request from a client application to access data at the enterprise system, and to retrieve a corresponding data and metadata from the enterprise system in response to the request; and
wherein the resource adapter is further adapted to
transform the metadata into an XML schema specific to the client application,
wherein the XML schema includes rules that specify the format of the data required by the client application,
transform the data and metadata into an XML document which includes XML data which further includes a plurality of XML elements corresponding to the data and metadata,
subsequent to transforming the data and metadata, create a document object that includes the entire contents of the XML document and that provides a queryable document interface to access the XML data therein,
query the XML document using the queryable document interface to extract only a portion of the XML data which is less than the entirety of the XML data, which includes the XML elements which correspond to the data requested by the client application,
validate at the application server, only those XML elements within the extracted portion of the XML data against the XML schema specific to the client application, including ensuring that each XML element within the extracted portion of the XML data satisfies the rules specified by the XML schema as to the format of the data required by the client application, and that the XML data is well-formed,
if each of the XML elements within the extracted portion of the XML data is determined to be valid then indicate the XML document as being valid against the XML schema specific to the client application, and communicate the validated XML document as a response document to the client application.

10. A system according to claim 9, further comprising:
a schema object model adapted to provide the ability to create the XML schema.

11. A system according to claim 9, further comprising:
an application view component adapted to provide an interface to the enterprise system for the client application.

12. The system of claim 9 wherein the document object can be accessed using an xpath interface, and wherein the extracting includes querying the document object by issuing an xpath command to the xpath interface.

13. A computer readable medium including instructions stored thereon which when executed cause the computer to perform the steps of:
receiving a request at an enterprise system from a client application to access data at the enterprise system;
retrieving data and metadata from the enterprise system, in response to the request from the client application;
transforming the metadata into an XML schema specific to the client application,
wherein the XML schema includes rules that specify the format of the data required by the client application;
transforming the data and metadata into an XML document which includes XML data which further includes a plurality of XML elements corresponding to the data and metadata;
subsequent to transforming the data and metadata, creating a document object that includes the entire contents of the XML document and that provides a queryable document interface to access the XML data therein;
querying the XML document using the queryable document interface, and extracting only a portion of the XML data which is less than the entirety of the XML data, which includes the XML elements which correspond to the data requested by the client application;
validating only those XML elements within the extracted portion of the XML data against the XML schema specific to the client application, including ensuring that each XML element within the extracted portion of the XML data satisfies the rules specified by the XML schema as to the format of the data required by the client application, and that the XML data is well-formed;
if each of the XML elements within the extracted portion of the XML is determined to be valid then indicating the XML document as being valid against the XML schema specific to the client application; and
communicating the XML document as a response document to the client application.

14. A method for implementing a schema object model to be used in integration between an enterprise system and a plurality of client applications, comprising:
creating a plurality of XML schemas for use by a plurality of client applications, wherein for each of the client applications, an XML schema specific to that client application is created by transforming metadata retrieved from the enterprise system, and wherein each XML schema includes rules that specify a data format required by that client application;
receiving a request from a particular one of the plurality of client applications to access data at the enterprise system;
retrieving data from the enterprise system in response to the request;

transforming the data into an XML document which includes XML data, and which further includes a plurality of XML elements corresponding to the data;

subsequent to transforming the data and metadata, creating a document object that includes the entire contents of the XML document and that provides a queryable document interface to access the XML data, wherein the queryable document interface allows the XML document to be queried and updated using XPath strings;

querying the XML document using Xpath and the queryable document interface to extract only a portion of the XML data which is less than the entirety of the XML data;

determining a particular XML schema specific to the particular client application that made the request, and validating only those XML elements within the extracted portion of the XML data against the particular XML schema, including ensuring that each XML element within the extracted portion of the XML data satisfies the rules specified by the XML schema as to the format of the data required by the client application, and that the XML data is well-formed;

if each of the XML elements within the extracted portion of the XML data is determined to be valid then indicating the XML document as being valid against the particular XML schema; and communicating the validated XML document to the client application that made the request.

15. A system for passing communication between an enterprise system and a client application, comprising:

a plurality of XML schemas specific to a plurality of client applications, wherein for each one of the plurality of client applications, one of the plurality of XML schemas is created by transforming metadata specific to that client application, and wherein each XML schema includes rules that specify a data format required by that client application and wherein at least one client application is executing on the at least one computer; and a resource adapter, executing on a server, adapted to
  receive a request from a particular one of the plurality of client applications to access data at the enterprise system,
  retrieve data from the enterprise system in response to the request;
  transform the data into an XML document which includes XML data, and which further includes a plurality of XML elements corresponding to the data,
  subsequent to transforming the data, create a document object that includes the entire contents of the XML document and that provides a queryable document interface to access the XML data, Wherein the queryable document interface allows the XML document to be queried and updated using XPath strings,
  query the XML document using Xpath and the queryable document interface to extract only a portion of the XML data which is less than the entirety of the XML data,
  determine a particular XML schema specific to the particular client application that made the request, and validate only those XML elements within the extracted portion of the XML data against the particular XML schema, including ensuring that each XML element within the extracted portion of the XML data satisfies the rules specified by the XML schema as to the format of the data required by the client application, and that the XML data is well-formed,
  if each of the XML elements within the extracted portion of the XML data is determined to be valid then indicate the XML document as being valid against the particular XML schema, and
  communicate the validated XML document to the client application that made the request.

16. A method for passing communication between an enterprise system and a client application, comprising:

receiving a request at an enterprise system from a client application;

retrieving data and metadata from the enterprise system, in response to the request from the client application;

subsequent to retrieving the data and metadata, transforming the data and metadata into XML data in an XML document;

transforming the metadata into an XML schema specific to the client application,
  wherein the XML schema includes rules that specify the format of the data required by the client application;

extracting a portion of the XML data that is less than the entirety of the XML data;

validating only the extracted portion of the XML data against the XML schema;

wherein the XML document is valid if the portion of the XML data is valid;

responding to the client application with the XML document if the portion of the XML data is valid; and if the portion of the XML data is invalid then
  if the client application should receive an invalid document, log an error and communicate the invalid document to the client application as a response document, and
  if the client application should not receive an invalid document then repeat the transformation and validation.

17. A system for passing communication between an enterprise system and a client application, comprising:

at least one computer having a processor operating thereon;

a plurality of XML schemas specific to a plurality of client applications, wherein each XML schema is specific to one of the client applications, and is created by transforming metadata specific to that client application, and wherein each XML schema specifies the format of data required by that client application and wherein at least one client application is executing on the at least one computer; and a resource adapter, executing on a server, adapted to
  receive a request at an enterprise system from a client application,
  retrieve data and metadata from the enterprise system, in response to the request from the client application,
  subsequent to retrieving the data and metadata, transform the data and metadata into XML data in an XML document,
  extract a portion of the XML data that is less than the entirety of the XML data,
  validate only the extracted portion of the XML data against the XML schema specific to the client application that made the request, wherein the XML document is valid if the extracted portion of the XML data is valid;
  respond to the client application with the XML document if the extracted portion of the XML data is valid; and if the extracted portion of the XML data is invalid then
   if the client application should receive an invalid document, log an error and communicate the invalid document to the client application as a response document, and if the client application should not receive an invalid document then repeat the transformation and validation.

* * * * *

UNITED STATES PATENT AND TRADEMARK OFFICE
CERTIFICATE OF CORRECTION

| | | |
|---|---|---|
| PATENT NO. | : 7,721,193 B2 | Page 1 of 1 |
| APPLICATION NO. | : 10/271047 | |
| DATED | : May 18, 2010 | |
| INVENTOR(S) | : Mitch Upton | |

It is certified that error appears in the above-identified patent and that said Letters Patent is hereby corrected as shown below:

On page 4, in column 2, under "Other Publications", line 11, delete "Search.Report" and insert -- Search Report --, therefor.

In column 3, line 41, delete "extensible" and insert -- eXtensible --, therefor.

In column 8, line 51, delete ".Org" and insert -- .org --, therefor.

In column 9, line 59, delete "isparsed()." and insert -- isParsed(). --, therefor.

In column 10, line 29, delete ""\Bob\"]" and insert -- \"Bob\"] --, therefor.

In column 10, line 30, delete ""\Jimmy\"]" and insert -- \"Jimmy\"] --, therefor.

In column 17, line 1, in claim 2, delete "wherein," and insert -- wherein --, therefor.

In column 19, line 52, in claim 15, delete "Wherein" and insert -- wherein --, therefor.

Signed and Sealed this
Twelfth Day of July, 2011

David J. Kappos
*Director of the United States Patent and Trademark Office*